United States Patent
Sato et al.

(10) Patent No.: US 7,814,358 B2
(45) Date of Patent: Oct. 12, 2010

(54) ELECTRONIC APPARATUS CAPABLE OF OUTPUTTING DATA IN PREDETERMINED TIMING REGARDLESS OF CONTENTS OF INPUT DATA

(75) Inventors: Hironori Sato, Okazaki (JP); Masayuki Imanishi, Okazaki (JP); Yasuhiko Satoh, Kariya (JP); Shusuke Aoki, Suzuka (JP); Satoshi Osanai, Oobu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 632 days.

(21) Appl. No.: 11/827,521

(22) Filed: Jul. 12, 2007

(65) Prior Publication Data
US 2008/0022147 A1    Jan. 24, 2008

(30) Foreign Application Priority Data
Jul. 18, 2006    (JP) ............................. 2006-196121

(51) Int. Cl.
*G06F 1/14* (2006.01)
(52) U.S. Cl. ...................................... 713/375; 713/502
(58) Field of Classification Search ................. 713/375, 713/400, 502, 600
See application file for complete search history.

(56) References Cited

U.S. PATENT DOCUMENTS
5,878,216 A    3/1999  Young et al.

2004/0054834 A1    3/2004    Devins et al.
2005/0050374 A1*   3/2005    Nakamura et al. .......... 713/375
2005/0278473 A1    12/2005   Schmidt

FOREIGN PATENT DOCUMENTS

| JP | 55-018775   | 2/1980  |
|----|-------------|---------|
| JP | 57-150046   | 9/1982  |
| JP | 57-203161   | 12/1982 |
| JP | 61-194566   | 8/1986  |
| JP | 04-225434   | 8/1992  |
| JP | 2000-226152 | 8/2000  |
| JP | 2002-176647 | 6/2002  |
| JP | 2006-012150 | 1/2006  |

OTHER PUBLICATIONS

Office action dated Dec. 19, 2008 in German Application No. 10 2007 032750.3.
Notification of Reasons for Rejection in corresponding JP patent application No. 2006-196121 dated Jul. 27, 2010 with English translation.

* cited by examiner

*Primary Examiner*—Dennis M Butler
(74) *Attorney, Agent, or Firm*—Harness, Dickey & Pierce, PLC

(57) ABSTRACT

Simply constituted electronic apparatus that can definitely output an outputted data after predetermined length of time from a time when an inputted data processing is started, even if data processing time of the inputted data varies with the contents of the data.

11 Claims, 6 Drawing Sheets

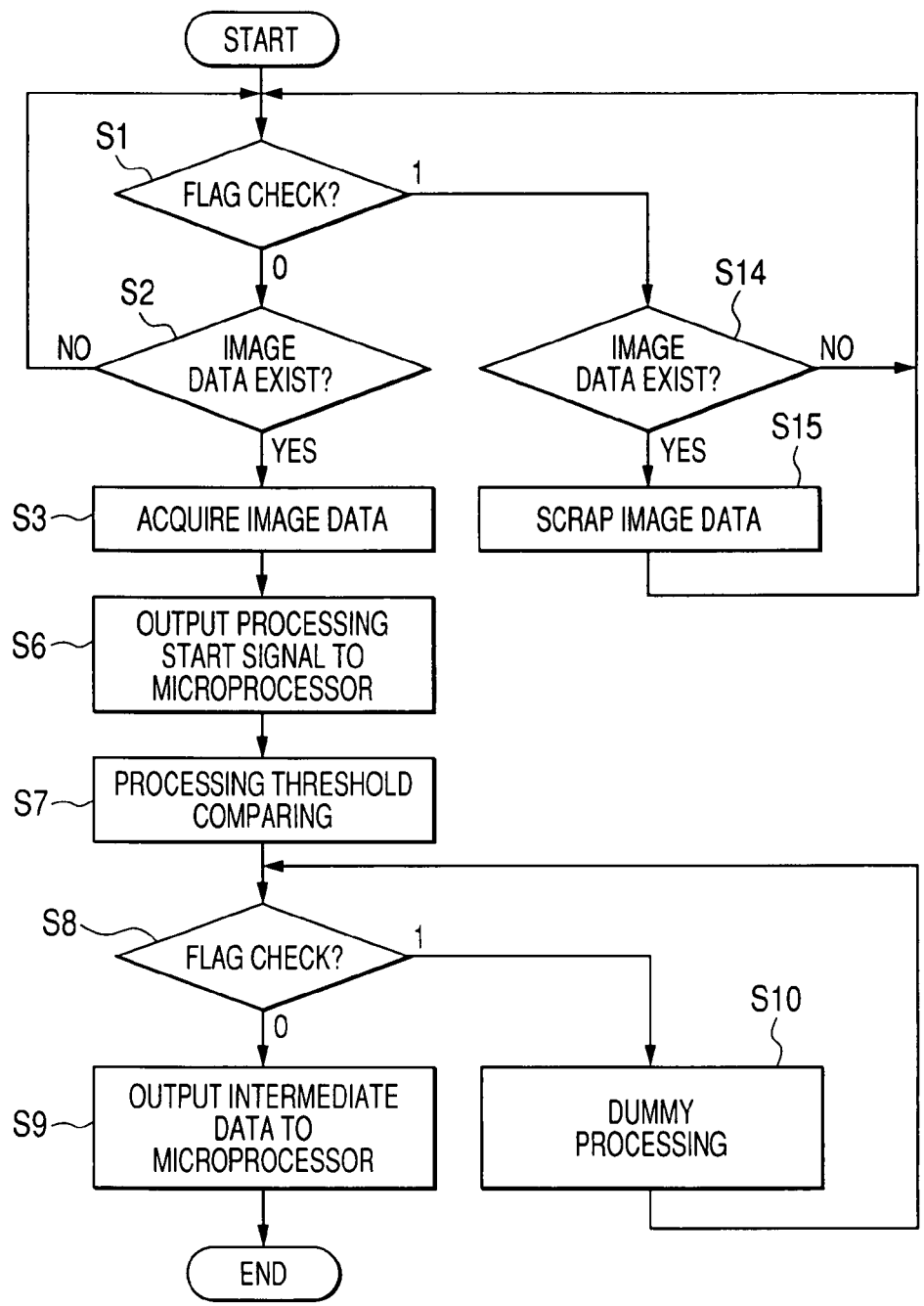

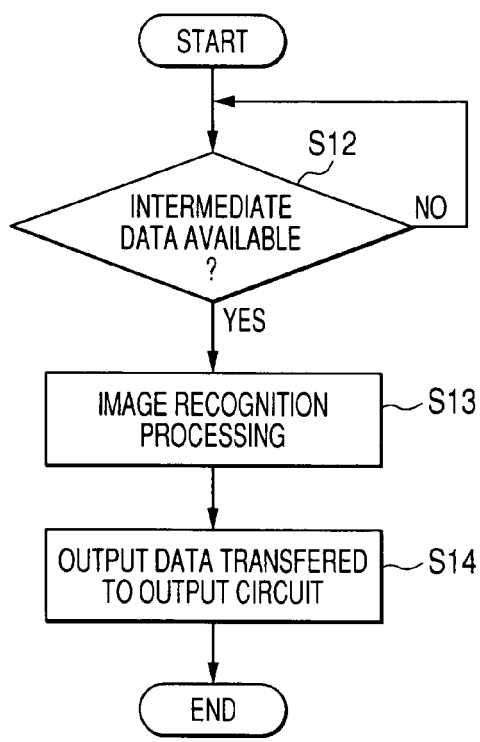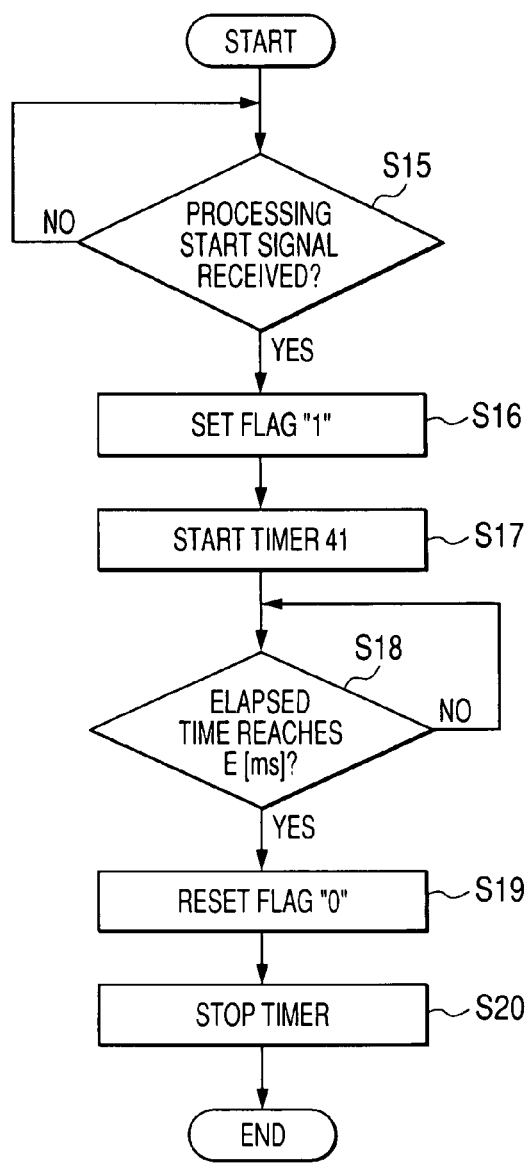

US 7,814,358 B2

ELECTRONIC APPARATUS CAPABLE OF OUTPUTTING DATA IN PREDETERMINED TIMING REGARDLESS OF CONTENTS OF INPUT DATA

CROSS-REFERENCE TO RELATED APPLICATION

This application is based on and claims the benefit of priority from earlier Japanese Patent Application No. 2006-196121 filed Jul. 18, 2006, the description of which is incorporated herein by reference.

BACKGROUND OF THE INVENTION

1. Field of the Invention

The present invention relates to a simply constituted electronic apparatus that can definitely output data after a predetermined length of time from a time when an inputted data processing is started, even if data processing time of the input data varies with the contents of data.

2. Description of the Related Art

Conventionally, various electronic apparatus using microprocessors are publicly known. For example, the device proposed in Japanese Patent Laid-open Publication No. 1982-150046 is known. The device is so constituted that a timer, a timer control circuit or the like is connected to a microprocessor and the microprocessor can be executed together with a user program and a debugging control program correctly. In addition, in Japanese Patent Laid-open Publication No. 1982-203161, the device is so constituted that a shift register, a counter or the like is connected to the microprocessor and the operating conditions of the microprocessor can be monitored using a small number of external pins.

In a conventional device, it is basically considered that simple circuits such as a timer and a shift register are connected to the microprocessor, and the device can be operated with them. however, it is not considered that complicated circuits such as image processing integrated circuit (image processing IC) are connected to the microprocessor to operate them. In the above-described complicated circuits, data processing time usually varies with the contents of an input data.

However, when the circuit is connected to the microprocessor to operate it, the outputting of an outputted data is often required after a predetermined length of time from a time when an inputted data processing is started as a whole. To meet this requirement, a method, where a timer device or the like, to synchronize the microprocessor and the circuit in connection with data processing is provided to synchronize data processing time in accordance with an elapsed time indicated by the timer is considered. However, this is not the best solution considering the complexity of a circuit design which makes the tasks more time consuming.

Another idea to meet this requirement is using memory devices in which output data can be stored to have a microprocessor read the data with the appropriate timing. Even this idea is not satisfactory due to a cost increase.

In this situation, the market requires to develop a simple circuit and appropriate method to be developed in order to solve these problems.

SUMMARY OF THE INVENTION

The present invention has been achieved in light of the above-described issues. An object of the invention is to provide a simply constituted electronic apparatus that can definitely output data after a predetermined length of time from a time when an inputted data processing is started, even if data processing time of the inputted data varies with the contents of the data. In order to achieve the above object, the present invention provides, as one aspect thereof, An electronic apparatus capable of outputting an output data at a predetermined timing comprising first processing means for performing first data processing with acquired input data so as to obtain a certain amount of intermediate data; second processing means for performing second data processing with the intermediate data obtained by the first processing means; output means for outputting the output data at a desired timing; and timing control means for controlling the desired timing using a flag showing that a variable execution period for the first data processing.

According to the configuration described above, the first processing means that outputs the processed results as a certain amount of intermediate data, after the first data processing is performed by acquiring the input data, and the second processing means that outputs the processed results as the output data, after the second data processing is performed by acquiring the intermediate data outputted from the first processing means. An execution period of the first data processing performed by the first processing means varies with the contents of an input data, and an execution period of the second data processing performed by the second processing means is determined by data amount of the intermediate data.

In addition, a flag is provided. The flag is set at a time when the first processing means starts the first data processing, The flag is reset after a first processing period lapses, the first processing period is determined as subtracting a required period for the second data processing from a predetermined total processing period, the predetermined total processing period is determined as a period between time of starting the first data processing and time that the output data shall be available.

The features of the electronic apparatus lies in that the first processing means suspend to output of an intermediate data if the flag is set a time when the completion of the first data processing, and execute the output of the intermediate data a time when the flag is reset.

Here, the first processing means processes data and the processing time varies depending on the contents of the data. For example, in image processing, image data to be processed from a camera depends on the type of source of images.

The source images are, for example images of vehicles, buildings, and other objects. The images vary dynamically when the apparatus is in operation for acquiring the image data. Changes in the type of source images bring a changes in contents of image data to be processed. Therefore the processing period should depend on the types of original source images.

In addition, the second processing means process data and the processing time is determined by data amount, for example, as in routine data processing by a microprocessor. In this processing, the outputting of the intermediate data that is the processing result is suspended, if the data processing is finished before a resetting time lapses (that is, at a time when a flag is set) after the first processing means starts the first data processing. Then, the intermediate data is outputted at a time when a resetting time lapses (that is, the flag is reset) from a time when the first processing means starts the first data processing. For that reason, a time when the first processing means outputs the intermediate data is always a time when the first processing time lapses from a time when the inputted data processing is started, even if the first data processing is finished within the first processing time. In addition, the intermediate data is a certain data amount, because an execution period of the second data processing performed by the second processing means is determined by data amount of the intermediate data, the execution period of the second data processing is always constant. Thus, the electronic apparatus can keep constant a time between the time when an inputted data processing is started and the time when an outputted data is outputted, even if the first data processing is finished at any time within the first processing time. In other words, an outputted data can be definitely outputted after a predetermined length of time from a time when an inputted data processing is started. In addition, the device can be a simple configuration because it is unnecessary to install a timer device or the like to synchronize data processing.

BRIEF DESCRIPTION OF THE DRAWINGS

FIG. 5 is a flow chart showing a processing flow of the image processing integrated circuit in a first embodiment.

FIGS. 6 and 7 are flow charts showing processing flow of the microprocessor of a first embodiment.

DETAILED DESCRIPTION OF THE PREFERRED EMBODIMENTS

First Embodiment

Hereinafter are described some embodiments of the present invention.

Figure 1:
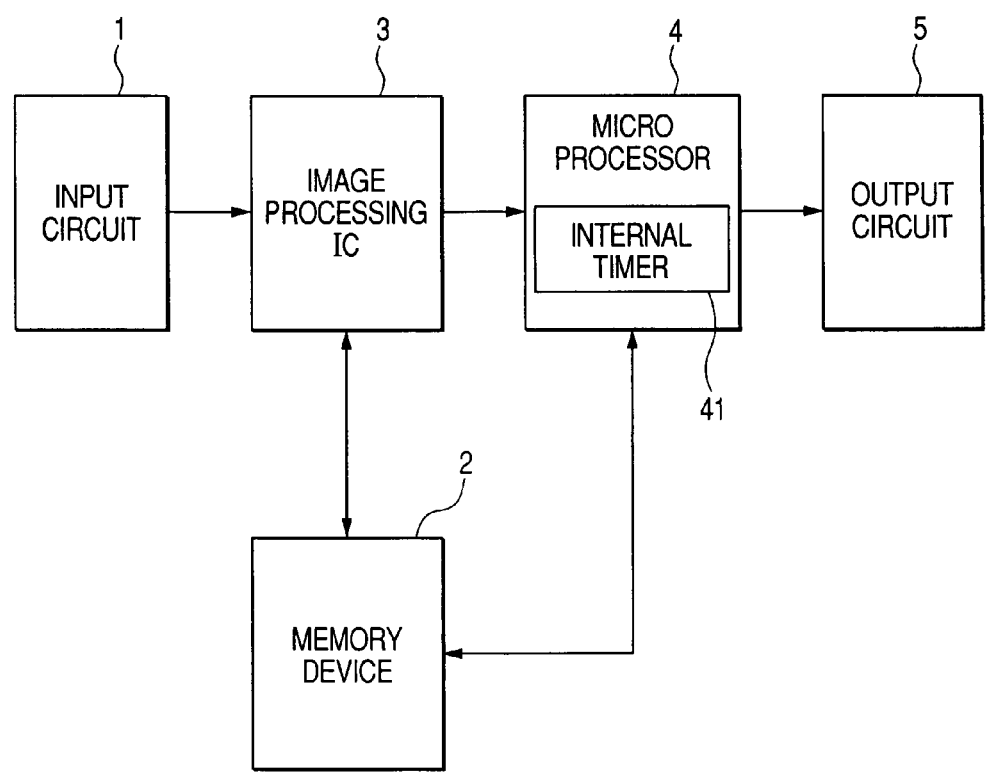
FIG. 1 is a block diagram showing the entire configuration of an electronic apparatus in one embodiment according to the present invention.
Figure 3:
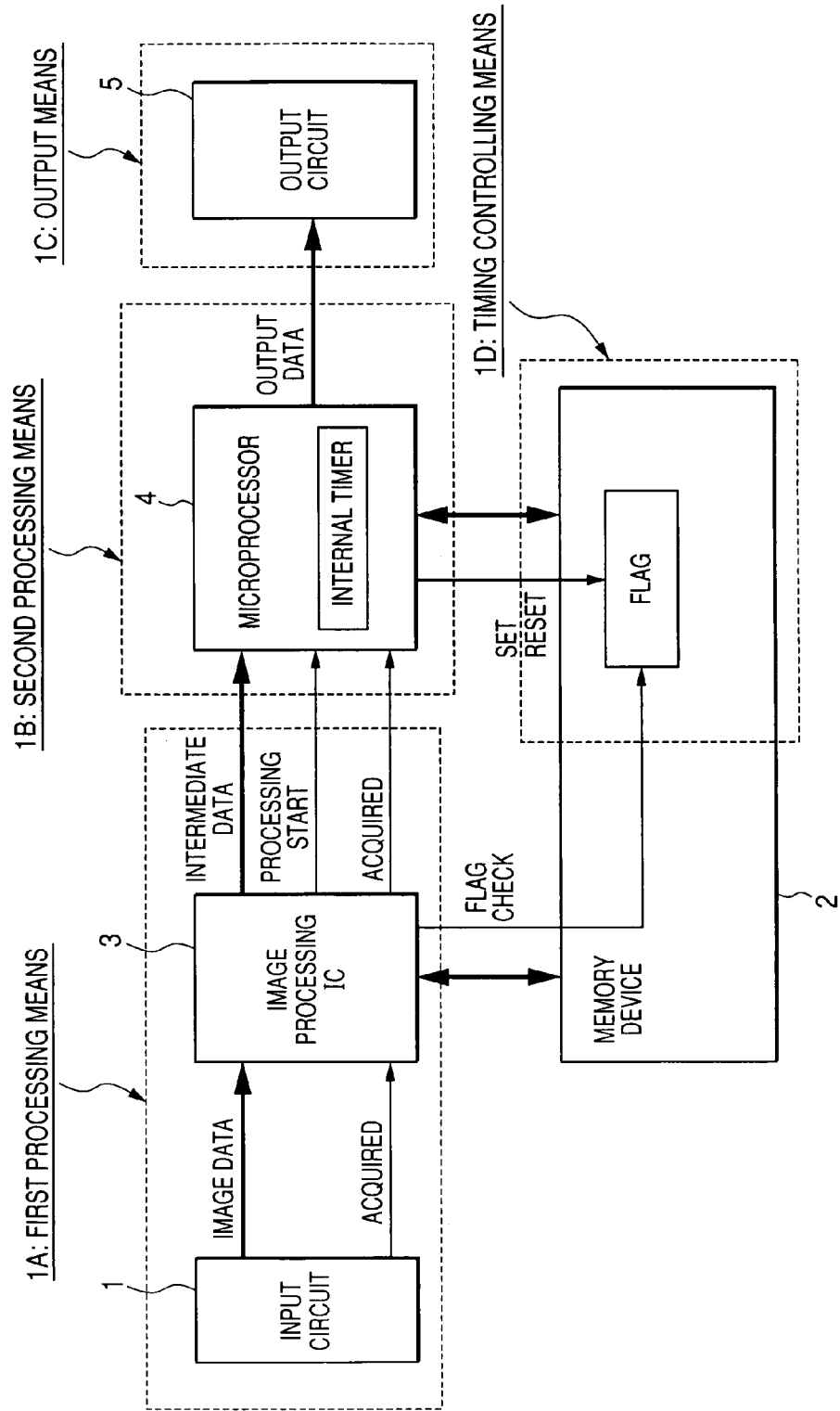
FIG. 3 is a detail block diagram showing the entire configuration of an electronic apparatus including a control signals from the FIG. 1.

FIG. 1 is a block diagrams showing the entire configuration of an electronic apparatus in the first embodiment according to the present invention. FIG. 3 is a detail block diagram for FIG. 1 including main control signals. The electronic apparatus of the embodiment is an image recognition device including an input circuit 1, a memory device 2, an image processing integrated circuit 3 (Image processing IC3), a microprocessor 4, and an output circuit 5, and acquires an image signal transmitted from an unillustrated camera and performs an image recognition on an object photographed by the camera.

As shown in FIG. 1, the input circuit 1 is, for example, an interface circuit provided with an analog to digital converter (A/D converter), receives an image signal transmitted by a predetermined period hour T/2 (ms) from the unillustrated camera to convert the same into digital data and creates an image data (inputted data) to data transfers the same to the image processing IC3. As shown in FIG. 3, in this case, the input circuit 1 also outputs an acquired signal showing that it outputs the image data to the image processing IC3. The acquired signal is utilized by the microprocessor 4 later described. In addition, the acquired signal may be directly outputted to the microprocessor 4.

The memory device 2 is, for example, a DRAM, and is used as a temporary memory region when the image processing IC3 or the microprocessor 4 performs data processing. The memory device 2 is further provided with a flag that permits and inhibits data transfer from the image processing IC3 to the microprocessor 4. The above-described flag shows that data transfer from the image processing IC3 to the microprocessor 4 is inhibited if it is set at 1, and shows that data transfer from the image processing IC3 to the microprocessor 4 is permitted if it is reset to 0. Because providing the memory device 2 with a flag allows the configuration of the device to be simplified, it is preferable from the viewpoints of design and cost. The flag in a memory device constitutes the timing control means 1D refer to FIG. 3.

The image processing IC3 is constituted by a publicly known computer, acquires an image data to perform a threshold comparing, creates the processing results as a threshold comparing data that is a certain data amount to transfer the same to the microprocessor 4.

FIG. 5 shows a flowchart of this image processing. The image processing IC3 acquires an image data when the image data is transferred from input circuit 1, if the flag provided in the memory device 2 is reset to 0 (Step S1 to S3). Then, it performs a threshold comparing (step S7) to judge whether or not brightness and chromaticity of each pixel contained in the acquired image data exceeds predetermined threshold values, and creates the judgment results as a threshold comparing data (intermediate data) that is a certain data amount (first data processing). In addition, The image processing IC3 outputs a processing start signal (Step S6) showing that the processing is started to the microprocessor 4 when it starts the above-described threshold comparing. An execution period of the threshold comparing performed by the image processing IC3 varies with the content of the image data acquired from the input circuit 1. In addition, if the above-described flag is set at 1, the image processing IC3 scraps an image data transferred from the input circuit 1 (Step S1,S4,S5).

In addition, the image processing IC3 data transfers the created threshold comparing data to the microprocessor 4 if the flag provided in the memory device 2 is reset (step S8,S9). Concretely, if the image processing IC3 creates a threshold comparing data, it confirms the flag provided in the memory device 2 (step S8).

If the flag is set at 1, the image processing IC3 judges that data transfer to the microprocessor 4 is inhibited if the flag is set at 1, and suspend data transfer of the created threshold comparing data to the microprocessor 4 to execute a dummy processing (step S8,S10). Thereafter, the image processing IC3 judges that data transfer to the microprocessor 4 is permitted if the flag is reset to 0, then transfers the created threshold comparing data to the microprocessor 4 (step S8,S9). In addition, the image processing IC3 outputs the signal to the microprocessor 4 irrespective of a status of the flag stored in the memory device 2 if the acquired signal is outputted from the input circuit 1. In addition, the input circuit 1 and the image processing IC3 constitute the first processing means 1A refer to FIG. 3.

The microprocessor 4 is composed of a publicly known computer, if a threshold comparing data (intermediate data) is transferred from the image processing IC3, it acquires the data to perform an image recognition processing (second data processing), and recognizes an object photographed by a camera to create a recognition data (outputted data).

The created recognition data is immediately transferred to the output circuit 5. A flow chart of this processing is as shown in FIG. 6 (Step S12 to S14).

An execution period of the image recognition processing performed by the microprocessor 4 is determined by data amount of the threshold comparing data, and does not depend upon a content of the threshold comparing data.

In addition, the microprocessor 4 sets and resets the flag provided in the memory device 2. The processing flow executed by the microcomputer is as shown in FIG. 7.

Concretely, if a processing start signal is outputted from the image processing IC3 (step S15), the microprocessor 4 sets the flag provided in the memory device 2 to 1 to inhibit data transfer to the microprocessor 4 from the image processing IC3 (step S16) and start counting an elapsed time by starting an internal timer 41 (step S17). If the elapsed time indicated by the internal timer 41 becomes a predetermined time E (ms) (first processing time, step s18), the microprocessor 4 resets the flag provided in the memory device 2 to 0 and resets the internal timer 41 to suspend the operation (step S19,S20).

The configuration of the device can be more simplified by allowing the microprocessor 4 to set and reset the flag utilizing the internal timer 41.

However, if the flag is reset to 0 and a threshold comparing data is not transferred from the image processing IC3, the microprocessor 4 sets the flag again, and transfers the previously created recognition data to the output circuit 5 after a time required for the above-described image recognition processing lapses. Thereafter, the microprocessor 4 starts the internal timer 4 to start counting an elapsed time if an acquired signal is outputted from the image processing IC3 (in this case, because the flag is set at 1, the image processing IC3 scraps an image data transferred from the input circuit 1). Then, it resets the flag again after a predetermined time E (ms) lapses, and rests the internal timer 41 to suspend the operation. The microprocessor 4 constitutes the second processing means 1B refer to FIG. 3.

The output circuit 5 is connected to the unillustrated network, if it acquires a recognition data transferred from the microprocessor 4, it transmits the data to the unillustrated external device through the network. The output circuit 5 constitute the output means 1C refer to FIG. 3.

Flow charts of FIG. 5 to 7 represent functional processing flow of these operations described above. Next, the detailed operations of the electronic apparatus including timing sequence are described with reference to the timing chart shown in FIG. 2.

Figure 2:
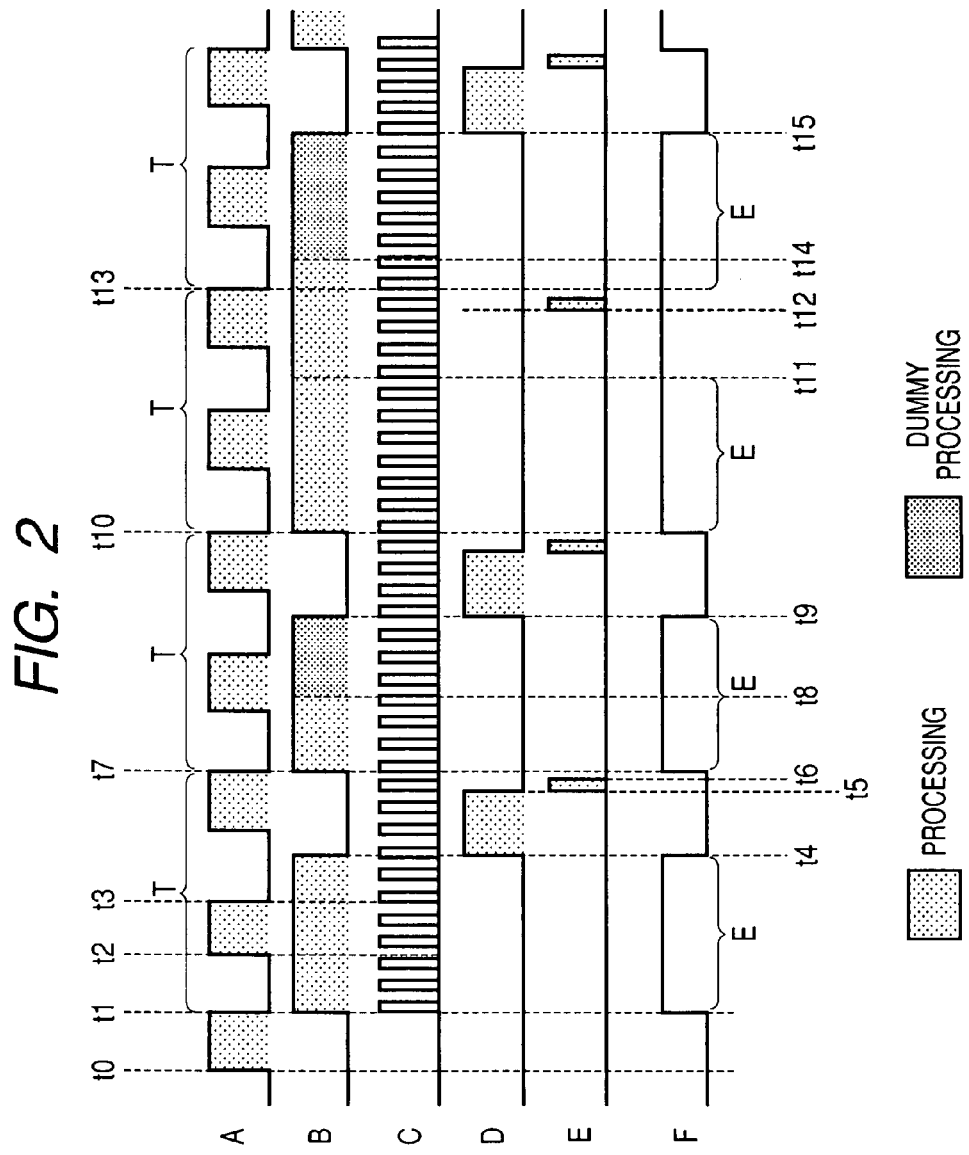
FIG. 2 is a timing chart showing operations at each time of various units that compose the electronic apparatus of a first embodiment.

In the first place, the charts A to F in the timing chart shown in FIG. 2 are described. Chart A shows the timings that the input circuit 1 acquires an image signal transmitted from a camera and converts the signal into an image data to data transfer the same. A period in which Chart A is in Hi shows that the input circuit 1 converts the image signal acquired from the camera into the image data and data transfer the same to the image processing IC3. Here, it is understood that the image signal from the camera is transmitted to input circuit 1 by each T/2 (ms) period and the signal is converted into the image data and is data transferred to the image processing IC3 as this period.

Chart B shows the timings that the image processing IC3 acquires the image data transferred from the input circuit 1 to perform a threshold comparing. A period indicated in Hi in Chart B shows that the image processing IC3 is now executing the threshold comparing.

Charts C and D are the charts related to the operations of the microprocessor 4. Chart C shows the timings of an operating clock in the microprocessor 4. Chart D shows the timings that the microprocessor 4 acquires a threshold comparing data transferred from the image processing IC3 to perform an image recognition processing. A period indicated in Hi in Chart D shows that the microprocessor 4 is now executing the image recognition processing.

Chart E shows the timings that the output circuit 5 is now transmitting a recognition data transferred from the microprocessor 4 to an external device through a network. A period indicated in Hi in Chart E shows that the output circuit 5 is now transmitting the recognition data to the external device.

Chart F is a chart showing the timings of setting and resetting of the flag provided in the memory device 2. A period indicated in Hi in Chart F shows that the flag is set at 1. A period indicated in Low shows that the flag is reset to 0.

Next, the concrete operations at each time of the electronic apparatus are described.

(0) In time t0 to t1, the input circuit 1 converts a first image signal transmitted from the camera into an image data and transfers the image data to the image processing IC3 (A). In addition, it outputs an acquired signal to the image processing IC3.

(1) At t1, the image processing IC3 acquires an image data transferred from the input circuit 1 to start a threshold comparing (B), and outputs a processing start signal to the microprocessor 4. In addition, the image processing IC3 outputs an acquired signal outputted from input circuit 1 to the microprocessor 4. The microprocessor 4 has the flag set at 1 (F) by outputting the processing start signal from the image processing IC3, and starts the internal timer 41 to start counting an elapsed time. In addition, the microprocessor 4 does not perform an operation to the outputting of the acquired signal from the image processing IC3.

(2) In time t2 to t3, the input circuit 1 converts a second image signal transmitted from the camera into an image data and data transfers the image data to the image processing IC3 (A) In addition, it outputs an acquired signal to the image processing IC3. At this point, because the flag is set at 1 (F), the image processing IC3 scraps the image data to continue the threshold comparing, and outputs an acquired signal outputted from the input circuit 1 to the microprocessor 4. This allows the image processing IC3 to continue the threshold comparing under execution, even if a new image data is transferred from the input circuit 1 while the threshold comparing is being executed. In addition, the microprocessor 4 does not perform an operation to the outputting of an acquired signal from the image processing IC3.

(3) At time t4 (after E (ms) lapses from time t1), because the elapsed time indicated by the internal timer 41 becomes E (ms), the microprocessor 4 has the flag reset to 0 (F). In addition, the image processing IC3 finishes the threshold comparing started at time t1 and creates a threshold comparing data (B). In this case, the image processing IC3 judges that data transfer to the microprocessor 4 is permitted because the flag is reset to 0, and transfers the created threshold comparing data to the microprocessor 4. The microprocessor 4 acquires the threshold comparing data transferred from the image processing IC3, and starts an image recognition processing (D).

(4) At time t5, the microprocessor 4 finishes the image recognition processing started at the time t4 and transfers the created recognition data to the output circuit 5 (D). The output circuit 5 acquires a recognition data transferred from the microprocessor 4 (E).

(5) In time t5 to t6, the output circuit 5 transmits the acquired recognition data to an external device through a network (E).

(6) At time t7, as in time t0, the image processing IC3 acquires an image data transferred from the input circuit 1 to start the threshold comparing (B), and outputs a processing start signal to the microprocessor 4. The image processing IC3 further outputs an acquired signal outputted from the input circuit 1 to the microprocessor 4. The microprocessor 4 has the flag set at 1 (F) by outputting the processing start signal from the image processing IC3 and starts the internal timer 41 to start counting the elapsed time. In addition, the microprocessor 4 does not perform an operation to the outputting of an acquired signal from the image processing IC3.

(7) At time t8, although the image processing IC3 finishes the threshold comparing to create a threshold comparing data (B), it judges that data transfer of the threshold comparing data to the microprocessor 4 is inhibited because the flag is set at 1 (F), and suspend the transfer of the created threshold comparing data to the microprocessor 4 to start a dummy processing.

(8) At time t9 (after E (ms) lapses from time t7), the microprocessor 4 has the flag reset to 0 (F) because the elapsed time indicated by the internal timer 41 becomes E (ms). The image processing IC3 judges that data transfer to the microprocessor 4 is permitted because the flag is reset to 0, and finishes the dummy processing (B) to transfer the threshold comparing data to the microprocessor 4. The microprocessor 4 acquires a threshold comparing data transferred from the image processing IC3 to start an image recognition processing (D).

(9) At time t10, as in time t1 and time t7, the image processing IC3 acquires an image data transferred from the input circuit 1 to start a threshold comparing (B), and outputs a processing start signal to the microprocessor 4. The image processing IC3 further outputs the acquired signal outputted from the input circuit 1 to the microprocessor 4. The microprocessor 4 has the flag set at 1 by outputting a processing start signal from the image processing IC3 (F), it starts the internal timer 41 to start counting the elapsed time. In addition, the microprocessor does not perform an operation to the outputting of the acquired signal from the image processing IC3.

(10) At time t11 (after E (ms) lapses from time t10), the microprocessor 4 has the flag reset to 0 (F) because the elapsed time indicated by the internal timer 41 becomes E (ms). However, the image processing IC3 is still executing the threshold comparing (B), and a threshold comparing data is not yet transferred to the microprocessor 4. For that reason, the microprocessor 4 has the flag set at 1 again (F).

(11) At time t12 (after a time required for the microprocessor 4 to perform an image recognition processing lapses from time t11), the microprocessor 4 transfers the previously t outputted recognition data to the output circuit 5 (D). This allows the device to definitely output the recognition data after a predetermined length of time from a time at which a threshold comparing is started, even if a time required for the image processing IC3 to perform a threshold comparing becomes longer than E (ms). In addition, in this case, a sudden change in contents of the recognition data outputted from the output circuit 5 can be prevented by data transferring the previously created recognition data to the output circuit 5

(12) At time t13, although an image data is transferred from the input circuit 1 (B), the image processing IC3 scraps the image data to continue a threshold comparing because the flag is set at 1. In addition, it outputs an acquired signal outputted from the input circuit 1 to the microprocessor 4. The microprocessor 4 starts the internal timer 41 to start counting an elapsed time by receiving the acquired signal from the image processing IC3, after the flag is set at time till again.

(13) At time t14, the image processing IC3 finishes a threshold comparing (B). Because the flag is set at 1 at this point (F), the image processing IC3 judges that a transfer of the threshold comparing data to the microprocessor 4 is inhibited, and suspends transfer of the created threshold comparing data to the microprocessor 4 to start dummy processing (B).

(14) At time t15 (after E (ms) lapses from time t13), the microprocessor 4 has the flag reset to 0 (F) because the elapsed time indicated by the internal timer 41 becomes E (ms). In addition, the image processing IC3 judges that a transfer to the microprocessor 4 is permitted because the flag is reset to 0, it finishes the dummy processing (B) to transfer the created threshold comparing data to the microprocessor 4. This allows the threshold comparing data that is the processing results of the threshold comparing executed by the image processing IC3 to be outputted in place of the processing results in the scraped image data. The microprocessor 4 acquires a threshold comparing data transferred from the image processing IC3 to start an image recognition processing (D).

Thus, the electronic apparatus of the first embodiment is provided with the flag that is set at 1 if the image processing IC3 starts a threshold comparing, and is reset to 0 if a predetermined time E (ms) lapses. Then, the image processing IC3 suspends data transfer of the threshold comparing data to the microprocessor 4, if the flag is set at 1 at a time when the threshold comparing is finished, and the IC3 transfer the data to the microprocessor 4 if the flag is reset to 0. This allows a recognition data to be definitely outputted from the output circuit 5, after a predetermined length of time from the start of a threshold comparing, even if a time required for the threshold comparing varies with the contents of an image data. In addition, it is unnecessary to install a timer device or the like to synchronize data processing, thereby enabling the system to be a simple configuration.

Modified Embodiment

The first embodiment may be modified in various ways as follows.

Figure 4:
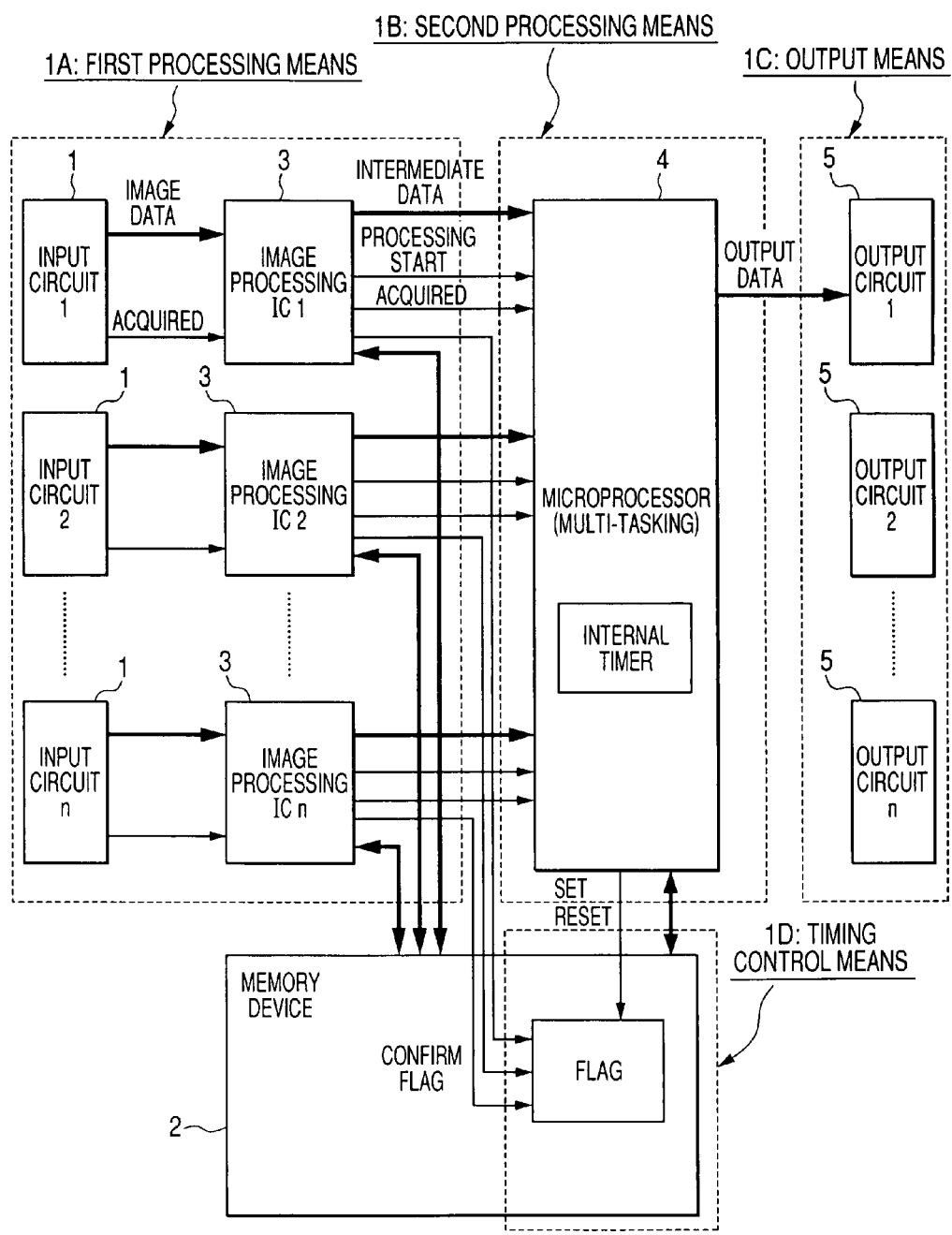
FIG. 4 is a detail block diagram showing the entire configuration of an electronic apparatus control signal in a modified embodiment

In the electronic apparatus of the first embodiment, the single image processing IC3 is operated by being connected to the microprocessor 4. However, a plurality of image processing integrated circuits may be provided as shown in FIG. 4. In this case, the microprocessor 4 shall process threshold comparing data outputted from each of the image processing integrated circuits by multi-tasking operation.

In these embodiment, there is described the electronic apparatus that outputs a recognition data after a predetermined length of time from a time when the threshold comparing of an image data is started. However, the electronic apparatus is not limited to that in the embodiment only. Any electronic apparatus may be preferably utilized if it is an electronic apparatus consisting of a unit where a processing time varies with the contents of an input data and a unit capable of processing the data outputted from the unit in a predetermined length of time.

What is claimed is:

1. An electronic apparatus comprising:
   means for periodically acquiring input data at first intervals;
   first processing means including means for performing first data processing with the acquired input data during a variable execution time such that the input data is produced as a constant amount of intermediate data, the variable execution time having a time length that varies with contents of the input data;
   second processing means for receiving the intermediate data and performing second data processing with the received intermediate data during a processing time such that the intermediate data is produced as output data, the processing time having a time length that varies depending on the constant amount of the intermediate data;
   means for periodically, at second intervals longer than the first intervals, outputting the output data obtained by the second processing means; and means for controlling i) timing at which the second processing means receives the intermediate data from the first processing means and ii) timing at which the variable execution time ends by using a flag, wherein the controlling means is configured to control the flag such that i) the flag is set at a time when the first processing means starts the first data processing and ii) the flag is reset at a time when a predetermined period lapses from the time when the flag is set, wherein the first processing means includes means for suspending providing of the intermediate data to the second processing means when the flag is set and the first processing means includes means for providing the intermediate data to the second processing means when the flag is reset.

2. The electronic apparatus according to claim 1, wherein the predetermined period is determined subtracting a required period for the second data processing from a predetermined total processing period that is a period between a time of starting the first data processing and a time when the output data shall be available.

3. The electronic apparatus according to claim 2, wherein the flag is set up in a memory region which is used for executing of the first and second data processing by the first and second processing means.

4. The electronic apparatus according to claim 1, wherein the second processing means is configured to output a predetermined data as the output data to the outputting means at a time after a required period for the second data processing, when the first processing means outputs no intermediate data at a timing when the flag is reset.

5. The electronic apparatus according to claim 4, wherein the contents of the predetermined data is the same as contents of previous data outputted by the second processing means.

6. The electronic apparatus according to claim 1, wherein the second processing means has means for counting an elapsed time, the counting means start the counting of the elapsed time when the first processing means start the first data processing, and the second processing means reset the flag when the elapsed time indicated by the counting means reaches the period of reset.

7. The electronic apparatus according to claim 1, wherein the first processing means periodically acquires the input data, when the flag is set at a timing of acquiring the input data, the first processing means cancel the data and continue executing of the first data processing being executed.

8. The electronic apparatus according to claim 7, wherein the second processing means has means for counting an elapsed time, the second processing means set the flag when the first processing means outputs no intermediate data at the timing of that the flag is reset, and the counting means start counting of the elapsed time at a timing of cancelling of acquired next input data, and the second processing means reset the flag again when the elapsed time counted by the counting means reaches the predetermined period.

9. An electronic apparatus comprising:
an input device for periodically acquiring input data at first intervals;
an image processing device for performing first data processing with the acquired input data during a variable execution time such that the input data is produced as a constant amount of intermediate data, the variable execution time having a time length that varies with contents of the input data;
a processor for receiving the intermediate data and performing second data processing with the received intermediate data during a processing time such that the intermediate data is produced as the output data, the processing time having a time length that varies depending on the constant amount of the intermediate data;
an output device for periodically, at second intervals longer than the first intervals, outputting the output data obtained by the processor; and
a control device configured to control i) timing at which the processor receives the intermediate data from the image processing device and ii) timing at which the variable execution time ends by using a flag, wherein the timing control device uses the flag such that i) the flag is set at a time when the image processing device starts the first data processing and ii) the flag is reset at a time when a predetermined period lapses from the time when the flag is set,
wherein the image processing device is configured to suspend providing the intermediate data to the processor when the flag is set and the image processing device is configured to provide the intermediate data to the processor when the flag is reset.

10. The electronic apparatus according to claim 9, wherein the predetermined period is determined by subtracting a required period for the second data processing from a predetermined total processing period that is a period between a time of starting the first data processing and a time of that the output data shall be available.

11. The electronic apparatus according to claim 9, wherein the processor is configured to output a predetermined data as the output data to the output device at a time after a required period for the second data processing, when the image processing device outputs no intermediate data at a timing when the flag is reset.

* * * * *